(No Model.)
2 Sheets—Sheet 1.
W. W. MAYBERRY.
CORD HOLDER FOR GRAIN BINDERS.
No. 351,643.  Patented Oct. 26, 1886.
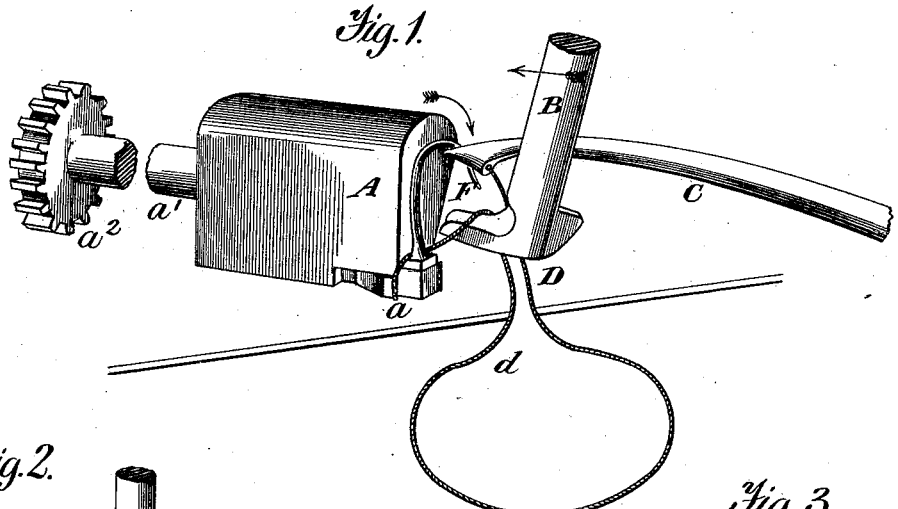
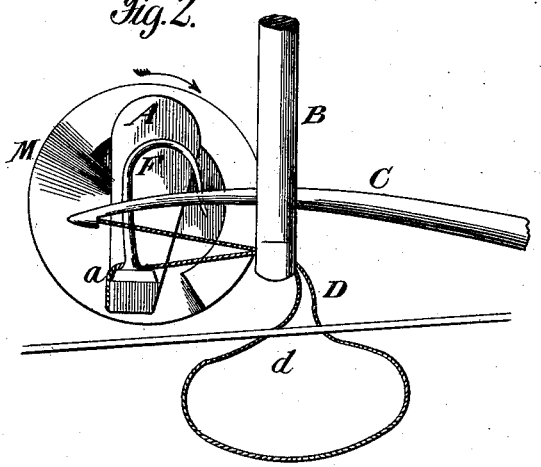
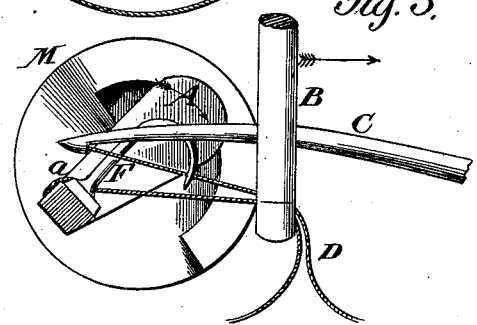
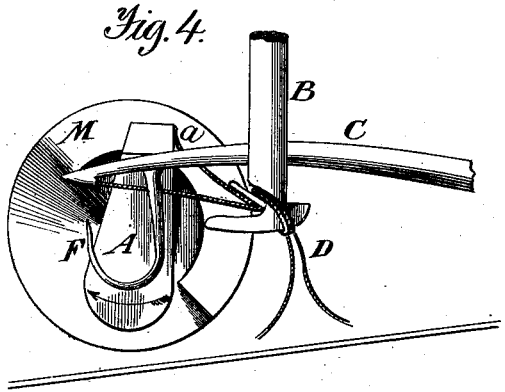
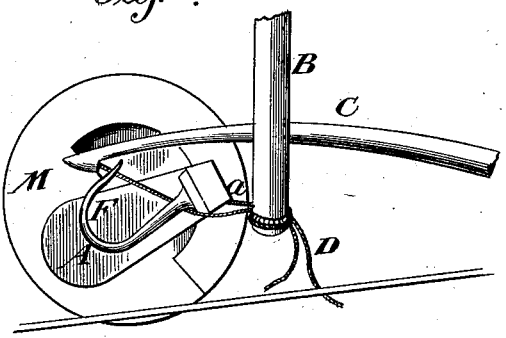
Witnesses.
A. Ruppert.
Alfred J. Gage.
Inventor.
W. W. Mayberry,
Per
Thomas P. Simpson,
Attorney.

(No Model.) 2 Sheets—Sheet 2.

W. W. MAYBERRY.
CORD HOLDER FOR GRAIN BINDERS.

No. 351,643. Patented Oct. 26, 1886.

Witnesses.
A. Ruppert.
Alfred T. Gage.

Inventor:
W. W. Mayberry,
Per
Thomas P. Simpson
attorney.

United States Patent Office.

WILLIAM WHITFIELD MAYBERRY, OF BRISTOW, IOWA.

CORD-HOLDER FOR GRAIN-BINDERS.

SPECIFICATION forming part of Letters Patent No. 351,643, dated October 26, 1886.

Application filed June 6, 1885. Serial No. 167,833. (No model.)

*To all whom it may concern:*

Be it known that I, WILLIAM WHITFIELD MAYBERRY, of Bristow, in the county of Butler and State of Iowa, have invented an Improved Cord-Holder for Grain-Binders, of which the following is a specification.

The special object of the invention is to improve that class of self-binding harvesters in which twine is used to hold the grain in bundles, by making it certain that the twine will be in position when needed, and by providing a quick, reliable movement, and by avoiding waste of twine.

Figure 6:
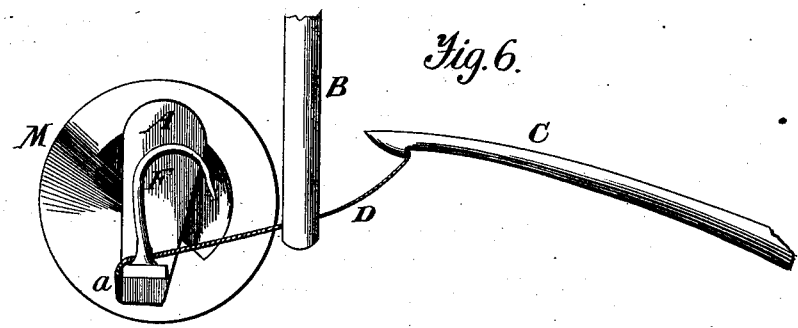
Figure 7:
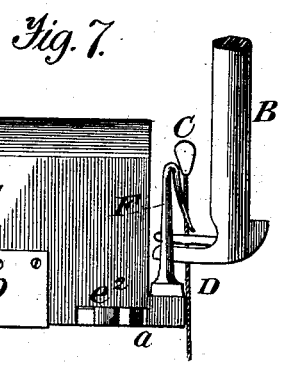
Figure 8:
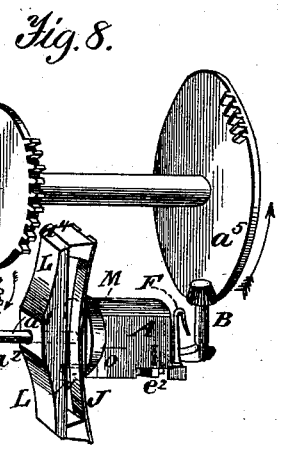
Figure 9:
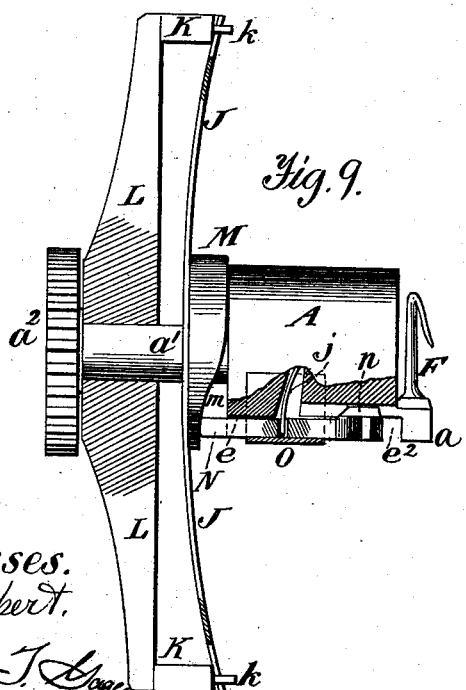
Figure 10:
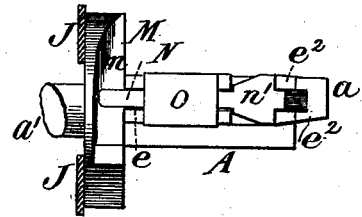

Figure 1 of the drawings is an elevation showing the relation of the twine-holder and knot-tyer. Fig. 2 is also an elevation showing the end of twine-holder ready for a bundle and the needle in the act of delivering the twine thereto. Fig. 3 shows the twine-holder partly turned with the hook bringing the string into position. Fig. 4 shows the twine-holder further turned and the knot-tyer partially. Fig. 5 shows the twine-holder having the end of twine near enough to the knot-tyer to be let go and the needle to start back to the right. Fig. 6 shows the twine-holder turned over and holding the twine for another bundle. Fig. 7 shows the string striking the hook and hanging down from the end of needle. Fig. 8 shows the gear mechanism by which the twine-holder is preferably driven. Fig. 9 shows the holder with cam-spring and holder-slide. Fig. 10 is a bottom view of the twine-holder.

In the drawings, A represents the revolving twine-holder frame; B, the knot-tyer; C, the needle; D, the string, having a loop, $d$, in position around the bundle; and $a^2$, a pinion on twine-holder shaft, which is turned by it.

To the side of the holder next to the knotter is attached a hook, F, preferably made elastic, which has its point bent outwardly from the frame of the holder, so as to pass outside the cord as it is brought up by the needle after the bundle has been formed, and thus in its revolution guide it into the proper position alongside of the first strand as it is held in the jaw of the holder.

The holder is itself constructed as follows: Projecting downwardly from the frame of the holder is the lug $a$. In the lower face of the holder-frame is formed a groove, $e$. Secured and reciprocating in said groove is the slide-plate $n$, the head of which, $n'$, engages the lug $a$, and thus holds the cord, which is laid in the opening $e^2$ in the side of the holder. The plate O, secured to the side of the holder-frame and having the flange extending thereunder, serves to hold this slide in place.

L is a frame piece or bar secured to any suitable part of the main frame, and provided with bearings for the shaft $a'$. Projecting from this bar are the lugs K, to which are secured the flat springs J J by means of pins $k$ on said lugs passing through slots in the ends of the springs J. Secured thereto and concentric with the shaft $h'$ is the circular cam-faced block M, in whose face is formed the depression $m$. The rear end of the holder-slide N is reduced and passes through a slot in the rear end of the holder-frame. This end bears against the fixed cam, and thus the slide is reciprocated back and forth as the holder revolves. A spring, $j$, is secured in the holder-frame, and serves to force back the slide and thus release the cord promptly as soon as the depression in the cam is reached.

The holder and knotter are driven by the shaft I, which is actuated by gearing from any suitable part of the machine. The disk $a^4$ is provided with the cog-segment on its periphery, which, through the intermediate pinion, $a^3$, drives the pinion on the holder-shaft. On the shaft I is also secured the disk $a^5$, which drives the knotter in the usual and well-known manner.

The operation of the device is as follows: As shown in Fig. 2 of the drawings, the cord lies in position over the knotter, having been brought up by the needle after the bundle has been formed. The holder now makes a quarter of a revolution, whereby the point of the hook F is brought outside of the cord and bears it inward as it turns, bringing it into the proper position for the knotter, which then begins to revolve in order to form the knot. When the holder reaches the position shown in Fig. 5 of the drawings, in which the holder-jaw is nearest to the knotter, the jaw N has reached the depression $m$ in the cam M, and is forced back by the spring, thus releasing the end of the cord first held. At this moment the jaws of the knotter are opened to seize the ends of the cord and draw them through the loop. The end of the cord leading to the needle is then cut by the knife, (not shown,) and as the holder continues its revolution the jaw N is forced back by the cam M and seizes the end of the cord. The needle then retreats and the parts assume their position to receive another bundle.

Having thus described all that is necessary to a full understanding of my invention, what I claim as new, and desire to protect by Letters Patent, is—

1. In a binding attachment for harvesters, the combination of the twine-holder A, the knot-tyer B, the needle C, and the hook F, attached to the revolving cord-holder and operating to guide the cord into position for the knotter, as and for the purpose described.

2. In a grain-binder, the combination, with a revolving cord-holder, of a frame, L, having lugs K, with pins $k$, a fixed cam-faced block, M, having the depression $m$, the slide N, reduced at its rear end, the slotted holder-frame carrying spring $j$, and the slotted springs J J, substantially as and for the purpose described.

WILLIAM WHITFIELD MAYBERRY.

Witnesses:
JAMES CONNOLLEY,
A. H. HITCHCOCK.